(12) United States Patent
Cudak et al.

(10) Patent No.: US 10,678,853 B2
(45) Date of Patent: Jun. 9, 2020

(54) ALIGNING VISUAL CONTENT TO SEARCH TERM QUERIES

(71) Applicant: INTERNATIONAL BUSINESS MACHINES CORPORATION, Armonk, NY (US)

(72) Inventors: Gary D. Cudak, Wake Forest, NC (US); Lydia M. Do, Research Triangle Park, NC (US); Christopher J. Hardee, Raleigh, NC (US); Adam Roberts, Moncure, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 936 days.

(21) Appl. No.: 14/984,548

(22) Filed: Dec. 30, 2015

(65) Prior Publication Data

US 2017/0193105 A1 Jul. 6, 2017

(51) Int. Cl.
*G06F 16/783* (2019.01)
*G06F 16/248* (2019.01)
*G06F 16/2453* (2019.01)

(52) U.S. Cl.
CPC ........ *G06F 16/7844* (2019.01); *G06F 16/248* (2019.01); *G06F 16/2453* (2019.01)

(58) Field of Classification Search
CPC ..................... G06F 17/30796; G06F 17/30554
See application file for complete search history.

(56) References Cited

U.S. PATENT DOCUMENTS

| 5,568,238 A | 10/1996 | Osbourne et al. |
| 8,099,446 B2 | 1/2012 | Carullo et al. |
| 2005/0216443 A1* | 9/2005 | Morton ............... G06F 17/3002 |
| 2006/0184553 A1 | 8/2006 | Liu et al. |
| 2008/0134033 A1* | 6/2008 | Burns ............... G06F 17/30696 |
| | | 715/705 |
| 2010/0070523 A1* | 3/2010 | Delgo ................... G11B 27/28 |
| | | 707/769 |

(Continued)

FOREIGN PATENT DOCUMENTS

WO 2012115593 A1 8/2012

OTHER PUBLICATIONS

Chang et al., "A Fully Automated Content-Based Video Search Engine Supporting Spatiotemporal Queries," IEEE Transactions on Circuits and Systems for Video Technology, vol. 8, No. 5, Sep. 1998.

(Continued)

*Primary Examiner* — Mark D Featherstone
*Assistant Examiner* — Ranjit P Doraiswamy
(74) *Attorney, Agent, or Firm* — Cantor Colburn LLP; Samuel Waldbaum

(57) ABSTRACT

Embodiments include method, systems and computer program products for aligning visual content to search term queries. In some embodiments, one or more search terms may be received. A plurality of results may be obtained using the one or more search terms on metadata associated with preprocessed visual media. A subset of frames may be selected for each of the plurality of results. A search results set may be generated by optimizing the subset of frames for each of the plurality of results. The search results set may be transmitted.

18 Claims, 3 Drawing Sheets

(56) References Cited

U.S. PATENT DOCUMENTS

| | | | |
|---|---|---|---|
| 2011/0047163 A1* | 2/2011 | Chechik | G06F 16/7867 |
| | | | 707/741 |
| 2012/0272192 A1 | 10/2012 | Grossman et al. | |
| 2013/0086051 A1 | 4/2013 | Brahms et al. | |
| 2015/0293996 A1* | 10/2015 | Liu | G06F 17/30823 |
| | | | 707/723 |
| 2016/0259856 A1* | 9/2016 | Ananthapur Bache | |
| | | | G06F 16/435 |
| 2018/0210954 A1* | 7/2018 | Guegan | G06Q 50/01 |

OTHER PUBLICATIONS

Toderici et al. "Finding meaning on youtube: Tag recommendation and category discovery." Computer Vision and Pattern Recognition (CVPR), 2010 IEEE Conference on. IEEE, 2010.

Yuan et al. "Fast and robust short video clip search using an index structure." Proceedings of the 6th ACM SIGMM International workshop on Multimedia information retrieval. ACM, 2004.

Zhao et al. "On the annotation of web videos by efficient near-duplicate search." Multimedia, IEEE Transactions on 12.5 (2010): 448-461.

* cited by examiner

ALIGNING VISUAL CONTENT TO SEARCH TERM QUERIES

BACKGROUND

The present disclosure relates to queries, and more particularly, to methods, systems and computer program products for aligning visual content to search term queries.

A web search query is a query that a user enters into a web search engine interface to obtain relevant information. Users may enter search terms to locate relevant content based on tagged text or keywords associated with the content. For instance, if a user is searching for specific video content, the user may enter one or more search terms and a web search engine may identify relevant content based on the search terms. The web search engine may capture key frames from the video stream (e.g., a group of pictures or images from the video stream) and may display the results using the key frames captured from the video.

SUMMARY

In accordance with an embodiment, a method for aligning visual content to search term queries is provided. The method may include receiving one or more search terms; obtaining a plurality of results using the one or more search terms on metadata associated with preprocessed visual media; selecting a subset of frames for each of the plurality of results; generating a search results set by optimizing the subset of frames for each of the plurality of results; and facilitating transmission or display of the search results set.

In another embodiment, a computer program product may comprise a non-transitory storage medium readable by a processing circuit and storing instructions for execution by the processing circuit for performing a method that may include receiving one or more search terms; obtaining a plurality of results using the one or more search terms on metadata associated with preprocessed visual media; selecting a subset of frames for each of the plurality of results; generating a search results set by optimizing the subset of frames for each of the plurality of results; and facilitating transmission or display of the search results set.

In another embodiment, a system for optimizing persistency using hybrid memory may include a processor in communication with one or more types of memory. The processor may be configured to receive one or more search terms; obtain a plurality of results using the one or more search terms on metadata associated with preprocessed visual media; select a subset of frames for each of the plurality of results; generate a search results set by optimizing the subset of frames for each of the plurality of results; and facilitate transmission or display of the search results set.

BRIEF DESCRIPTION OF THE DRAWINGS

The forgoing and other features, and advantages of the disclosure are apparent from the following detailed description taken in conjunction with the accompanying drawings in which.

DETAILED DESCRIPTION

In accordance with exemplary embodiments of the disclosure, methods, systems and computer program products for aligning visual content with search term queries are provided. The methods and systems described herein are directed to generating enhanced search results that depict an object associated with a search term used to obtain results. The search results may depict the object in key frames (also referred to as frames) associated with a video retrieved in response to the search term query. The systems and methods described herein may visually align content with search term queries, dynamically tailor images or frames using preferences specified by the user, and may introduce unique user interaction between search terms and video/image object recognition.

In an example embodiment, a user may enter a search term using an interface for a search engine on a client device, such as a smart phone or tablet. The search term may be transmitted to a server, which may obtain results by querying processed content using the search term. The server may then select a subset of frames for each video of the obtained results. The subset of frames may be frames that best align with the search term provided by the user. The server may then optimize the subset of frames using criteria provided by the user. The server may then return the results of all videos that match the search term. In some embodiments, the server may order the results by the quantity of times the searched objects appear. In some embodiments, if a user had provided multiple search terms and then selects or hovers over one of the search terms, the videos may show the searched objects that match the term. In some embodiments, the user may rotate through the matched subset of frames as they hover over each video link and highlight the search terms that correspond to that image. In some embodiments, the user may play a selected video from the search results from the first instance the matched objects are found to the last instance a matched object is found. In some embodiments, frames may be color code matched with color-coded search terms.

Figure 1:
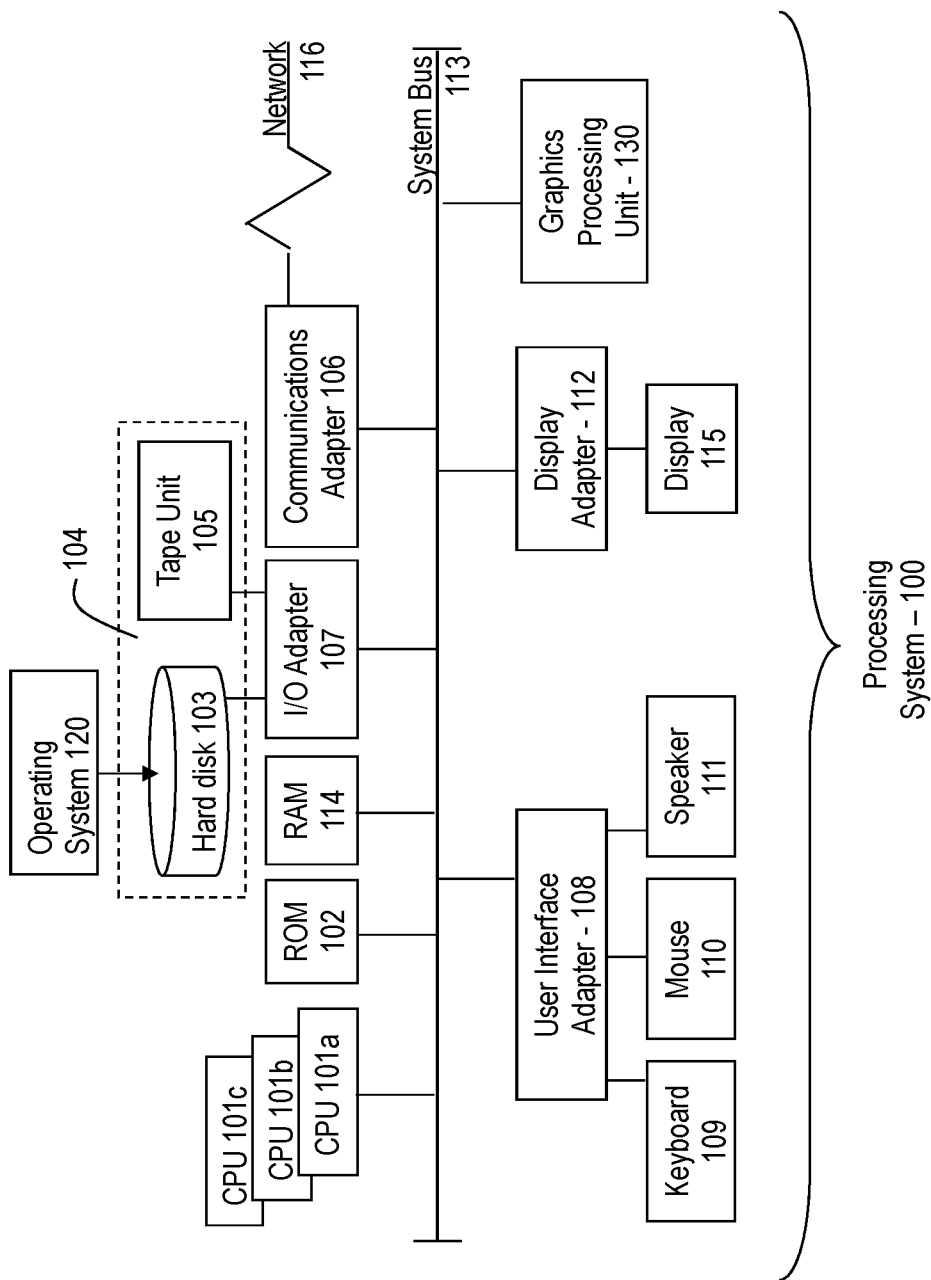
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101*a*, 101*b*, 101*c*, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics-processing unit 130. Graphics processing unit 130 is a specialized electronic circuit designed to manipulate and alter memory to accelerate the creation of images in a frame buffer intended for output to a display. In general, graphics-processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system such as the AIX® operating system from IBM Corporation to coordinate the functions of the various components shown in FIG. 1.

Figure 2:
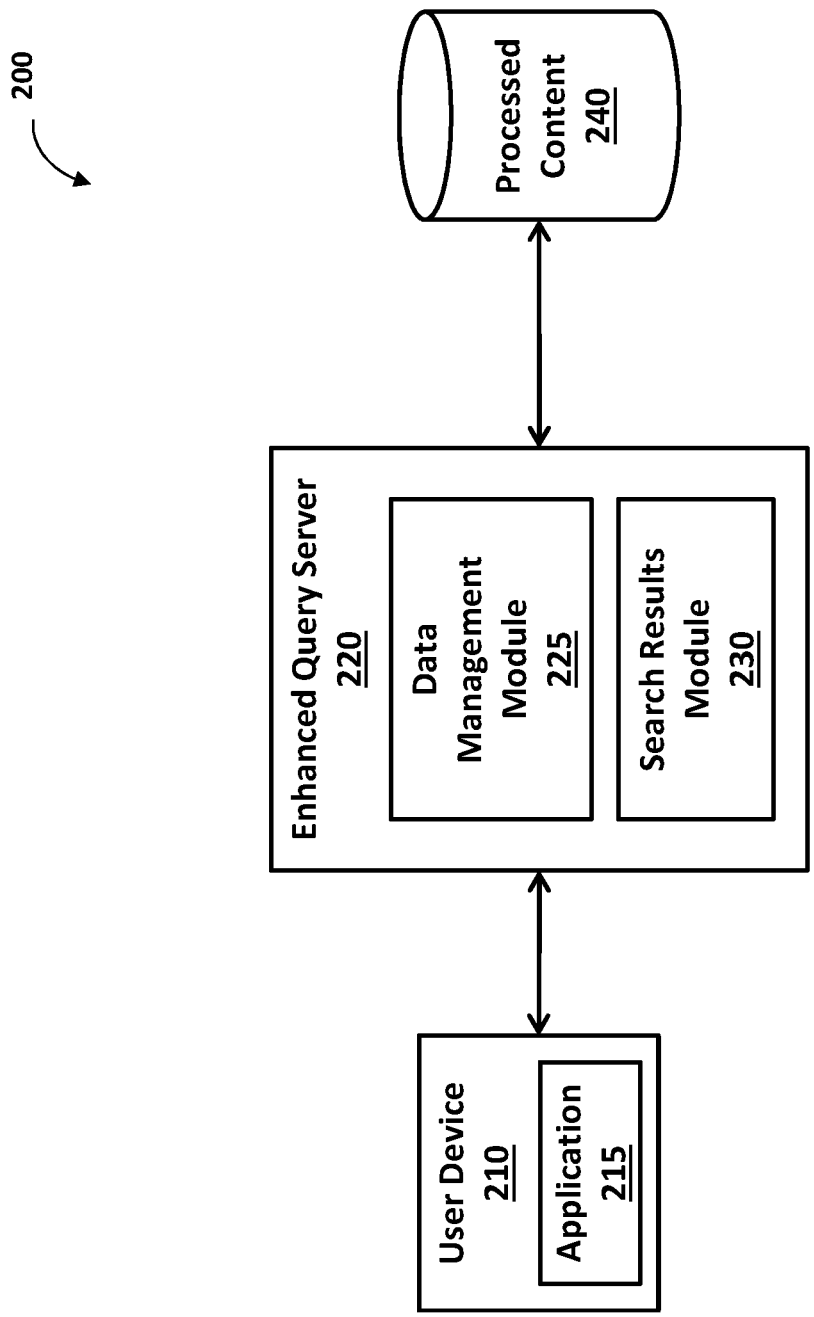
FIG. 2 is a block diagram illustrating a computing system in accordance with an exemplary embodiment.

Referring now to FIG. 2, a computing system 200 in accordance with an embodiment is illustrated. As illustrated, the computing system 200 may include, but is not limited to, user device(s) 210, an enhanced query server 220, and/or a processed content data store 240. A user device 210 may include an application 215. The enhanced query server 220 may include a data management module 225 and a search results module 230.

In some embodiments, the user device 210 may maybe any type of portable device that has the capability to connect to a network, such as using Wi-Fi or cellular technologies. Examples of a user device 210 may include smartphones, tablets, laptops, and the like. User devices 210 may include an application 215. The application 215 may include computer-readable instructions that in response to execution by the processor(s) 101 cause operations to be performed including providing one or more search terms to execute a search query. The application 215 may be a stand-alone application or may be a web browser that may be used to view a web interface for the enhanced query server 220. The application 215 may receive the search results set in response to the provided search terms and may display the search results set to the user.

In some embodiments, the enhanced query server 220 may include a data management module 225. The data management module 225 may include computer-readable instructions that in response to execution by the processor(s) 101 cause operations to be performed including receiving one or more search terms from the user device 210. In some embodiments, the user device may also provide criteria for optimizing the search results set generated using the one or more search terms. In some embodiments, the data management module 225 may transmit the one or more search terms to the search results module 230. The data management module 225 may receive a search results set from the search results module 230 and may apply the one or more criteria received from the user to the received search results set. The data management module 225 may transmit the optimized search results set to the user device 210 for presentation to the user.

In some embodiments, the enhanced query server 220 may include a search results module 230. The search results module 230 may include computer-readable instructions that in response to execution by the processor(s) 101 cause operations to be performed including receiving one or more search terms from the data management module 230. The search results module 230 may obtain results by executing a query using the search terms. The search results module 230 may query a processed content data store 240, where video content may have been previously processed to generate and associated metadata with the content. The data management module 230 may use the metadata associated with the videos to identify relevant matches and obtain search results using the one or more search terms.

Figure 3:
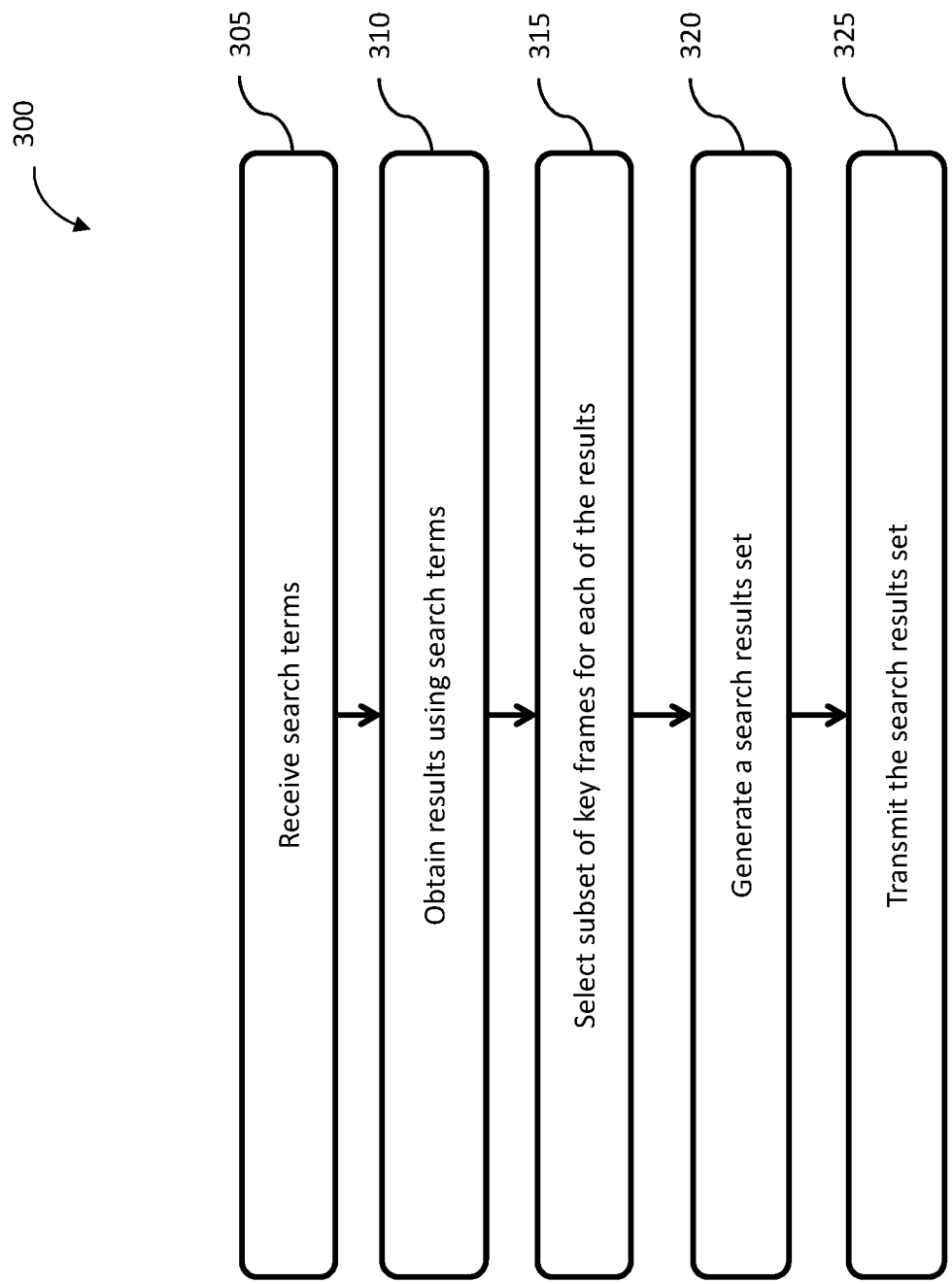
FIG. 3 is a flow diagram of a method for aligning visual content to search term queries in accordance with an exemplary embodiment.

Now referring to FIG. 3, a flow diagram of a method 300 for aligning visual content to search term queries in accordance with an exemplary embodiment is depicted At block 305, the data management module 225 may receive one or more search terms. In some embodiments, a user may interact with an application 215 on a user device 210 to submit one or more search terms. The application 215 may transmit the search terms to a data management module 225 of an enhanced query server 220. In some embodiments, the search term may include an identifier. For example, a user may specify that the subject they wish to view in the identified content as puppies. (e.g., object: puppies). In some embodiments, the user may specify an order associated with multiple search term to correspond to the order of frames selected. For example, the user may specify first:puppies, second:kittens, and third:bunnies. In some embodiments, the data management module 225 may also receive factors or criteria to use to order or filter the results obtained by the enhanced query server 220. Data management module 225 may transmit the one or more search terms to the search results module 230.

At block 310, the search results module 230 may obtain results using the search terms. In some embodiments, the search results module 230 may receive the one or more search terms from the data management module 225. In some embodiments, the search results module may obtain matches or results using the one or more search terms on metadata associated with preprocessed content, such as visual media (e.g., videos). In some embodiments, the search results module 230 may obtain results by comparing the one or more search terms with the metadata associated with content that indicates that the searched objects or term appears in the content. In some embodiments, the search results module 230 may also utilize a comments section associated with the content and generated by users to locate timed portions of the content along with the content (e.g., at 1:15, the duck falls through the street grate!)

At block 315, the search results module 230 may select a subset of key frames for each of the results. In some embodiments, the search results module 230 may select a subject of frames for each content (e.g., video) that best aligns with the search term provided by the user. For example, if a video contains a box and puppies jumping into the box midway through the video, the search results module 230 may select key frames depicting the puppies to align with the search term 'puppies'.

At block 320, a search results set may be generated. In some embodiments, the search results module 230 may transmit the results with corresponding key frames to the data management module 225. The data management module 225 may generate a search results set by optimizing the subset of frames for each of the plurality of results. In some embodiments, the data management module 225 may optimize the subset of frames for each video according to criteria provided by the user. Examples of factors or criteria may include, but are not limited to: frequency of search term (e.g., how many times does a search term appear?); ordering of objects searched (e.g., what order did the user specify the search terms?); strength or relevance (e.g., how relevant is the material found compared to the search terms?); or ceiling or floor limitations (e.g., how many times must a search term be found?).

In some embodiments, the data management module 225 may color designate a color for each of the one or more search terms and associate the color for each of the one or more search terms with a corresponding result of the plurality of results. The color code may match key frames with color-coded search terms. For example, the term puppies may be associated with the color purple so that key frames that contain puppies may have a purple border when displayed to the user.

In some embodiments, the data management module 225 may order the search results set based on a total number of frames containing the one or more search terms for each of the results and present the results of the search results set in descending or ascending order. The data management module 225 may order the results by the number of times the searched objects appear.

At block 325, the search results set may be transmitted. The search results set may be transmitted to the application 215 of the user device 210. In some embodiments, the data management module 225 may receive an indication that a pointer is hovering over a search term and may facilitate the presentation of a frame containing an object associated with the search term in each of the results of the search results set. In some embodiments, when the user selects or hovers over a search term on the user device 210, the videos may show the searched objects that match that term as a flat film-strip of matches or a timeline within that video of when the searched objects matches (i.e. "puppies"=0:05, 1:18, 2:00).

In some embodiments, the application 215 may allow the user to rotate through the matched subset of frames as they hover over each video link and highlight the search terms that correspond to that image. In some embodiments, the application 215 may allow the user to play the video from the first instance the matched objects are found to the last instance a matched object is found (i.e. "puppies"—start video at 0:05, play until 2:00).

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    receiving one or more search terms;
    obtaining a plurality of results using the one or more search terms on metadata associated with preprocessed visual media and using a comment section of the preprocessed visual media generated by users to locate timed portions of the preprocessed visual media;
    designating a color for each of the one or more search terms;
    selecting a subset of frames for each of the plurality of results;
    generating a search results set by optimizing the subset of frames for each of the plurality of results;
    associating the color for each of the one or more search terms with a corresponding result of the plurality of results, wherein borders of each frame of the subset of frames match the designated color for each of the one or more search terms;
    facilitating transmission or display of the search results set;
    receiving an indication that a pointer is hovering over a search term of the one or more search terms;
    facilitating presentation of a video containing searched objects matching the search term in each of the plurality of results of the search results set, wherein the plurality of results of the search results is displayed as at least one of a flat film-strip or a timeline within the video of when the searched objects matching the search term responsive to the hovering; and
    presenting the video from a first instance of the matched searched term and a last instance of the matched searched term of the search results.

2. The computer-implemented method of claim 1, wherein the one or more search terms comprises an identifier.

3. The computer-implemented method of claim 1, wherein generating the search results set by optimizing the subset of frames for each of the plurality of results further comprises:
    receiving one or more factors from a user to optimize the plurality of results; and
    generating the search results set by optimizing the plurality of results based on the one or more factors, wherein the one or more factors include a frequency of the one or more search terms or ceiling or floor limitations for the one or more search terms appearing in the search results.

4. The computer-implemented method of claim 1, further comprising:
    receiving an indication of an order associated with the one or more search terms.

5. The computer-implemented method of claim 1, further comprising:
    ordering the search results set based on a total number of frames containing the one or more search terms for each of the plurality of results; and
    presenting the plurality of results of the search results set in descending or ascending order.

6. The computer-implemented method of claim 1, further comprising:
    receiving an indication that a pointer is hovering over a search term of the one or more search terms; and
    facilitating presentation of a frame containing an object associated with the search term in each of the plurality of results of the search results set.

7. A computer program product comprising a non-transitory storage medium readable by a processing circuit and storing instructions for execution by the processing circuit for performing a method comprising:
    receiving one or more search terms;
    obtaining a plurality of results using the one or more search terms on metadata associated with preprocessed visual media and using a comment section of the preprocessed visual media generated by users to locate timed portions of the preprocessed visual media;
    designating a color for each of the one or more search terms;
    selecting a subset of frames for each of the plurality of results;
    generating a search results set by optimizing the subset of frames for each of the plurality of results;
    associating the color for each of the one or more search terms with a corresponding result of the plurality of results, wherein borders of each frame of the subset of frames match the designated color for each of the one or more search terms;

facilitating transmission or display of the search results set;
receiving an indication that a pointer is hovering over a search term of the one or more search terms;
facilitating presentation of a video containing searched objects matching the search term in each of the plurality of results of the search results set, wherein the plurality of results of the search results is displayed as at least one of a flat film-strip or a timeline within the video of when the searched objects matching the search term responsive to the hovering; and
presenting the video from a first instance of the matched searched term and a last instance of the matched searched term of the search results.

8. The computer program product of claim 7, wherein the one or more search terms comprises an identifier.

9. The computer program product of claim 7, wherein generating the search results set by optimizing the subset of frames for each of the plurality of results further comprises:
receiving one or more factors from a user to optimize the plurality of results; and
generating the search results set by optimizing the plurality of results based on the one or more factors, wherein the one or more factors include a frequency of the one or more search terms or ceiling or floor limitations for the one or more search terms appearing in the search results.

10. The computer program product of claim 7, wherein the method further comprises:
receiving an indication of an order associated with the one or more search terms.

11. The computer program product of claim 7, wherein the method further comprises:
ordering the search results set based on a total number of frames containing the one or more search terms for each of the plurality of results; and
presenting the plurality of results of the search results set in descending or ascending order.

12. The computer program product of claim 7, wherein the method further comprises:
receiving an indication that a pointer is hovering over a search term of the one or more search terms; and
facilitating presentation of a frame containing an object associated with the search term in each of the plurality of results of the search results set.

13. A system, comprising:
a processor in communication with one or more types of memory, the processor configured to:
receive one or more search terms;
obtain a plurality of results using the one or more search terms on metadata associated with preprocessed visual media and using a comment section of the preprocessed visual media generated by users to locate timed portions of the preprocessed visual media;
designate a color for each of the one or more search terms;
select a subset of frames for each of the plurality of results;
generate a search results set by optimizing the subset of frames for each of the plurality of results;
associate the color for each of the one or more search terms with a corresponding result of the plurality of results, wherein borders of each frame of the subset of frames match the designated color for each of the one or more search terms;
facilitate transmission or display of the search results set;
receive an indication that a pointer is hovering over a search term of the one or more search terms;
facilitate presentation of a video containing searched objects matching the search term in each of the plurality of results of the search results set, wherein the plurality of results of the search results is displayed as at least one of a flat film-strip or a timeline within the video of when the searched objects matching the search term responsive to the hovering; and
present the video from a first instance of the matched searched term and a last instance of the matched searched term of the search results.

14. The system of claim 13, wherein the one or more search terms comprises an identifier.

15. The system of claim 13, wherein, to generate the search results set by optimizing the subset of frames for each of the plurality of results, the processor is further configured to:
receive one or more factors from a user to optimize the plurality of results; and
generate the search results set by optimizing the plurality of results based on the one or more factors, wherein the one or more factors include a frequency of the one or more search terms or ceiling or floor limitations for the one or more search terms appearing in the search results.

16. The system of claim 13, wherein the processor is further configured to:
receive an indication of an order associated with the one or more search terms.

17. The system of claim 13, wherein the processor is further configured to:
order the search results set based on a total number of frames containing the one or more search terms for each of the plurality of results; and
present the plurality of results of the search results set in descending or ascending order.

18. The system of claim 13, wherein the processor is further configured to:
receive an indication that a pointer is hovering over a search term of the one or more search terms; and
facilitate presentation of a frame containing an object associated with the search term in each of the plurality of results of the search results set.

* * * * *